United States Patent
Haff et al.

(10) Patent No.: US 7,477,192 B1
(45) Date of Patent: Jan. 13, 2009

(54) DIRECTION FINDING SYSTEM AND METHOD

(75) Inventors: Andrew Haff, San Diego, CA (US);
Nicholas Cianos, Oceanside, CA (US);
Scott Ensign Marks, San Diego, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 24 days.

(21) Appl. No.: 11/709,405

(22) Filed: Feb. 22, 2007

(51) Int. Cl.
*G01S 5/02* (2006.01)
(52) U.S. Cl. .................. 342/423; 342/374; 342/383; 342/433; 342/434
(58) Field of Classification Search .................. 342/374, 342/383, 423–424, 433–434
See application file for complete search history.

(56) References Cited

U.S. PATENT DOCUMENTS

| 4,670,851 | A | 6/1987 | Murakami et al. |
| 5,077,798 | A | 12/1991 | Ichikawa et al. |
| 5,396,625 | A | 3/1995 | Parkes |
| 5,892,847 | A | 4/1999 | Johnson |
| 6,349,218 | B1 * | 2/2002 | Nakagawa et al. .......... 342/368 |
| 6,384,784 | B1 | 5/2002 | Gumm |
| 2006/0081050 | A1 * | 4/2006 | Workman .................... 73/602 |
| 2006/0145921 | A1 * | 7/2006 | Ranta et al. ................. 342/374 |

* cited by examiner

*Primary Examiner*—Thomas H Tarcza
*Assistant Examiner*—Fred H Mull
(74) *Attorney, Agent, or Firm*—Edward W Callan

(57) ABSTRACT

In a direction finding system, pluralities of signals provided by different sets of less than all of a plurality of arrayed antennas are code division multiplexed, downconverted by a single receiver, A/D converted and separated to derive signals that are processed to estimate the directions of arrival of the signals received by the different sets of antennas at different frequencies. The signals from different antennas are coded with different codes that have a common M-sequence and different phases for the different antennas. The derived signals are processed to detect the presence of signals and simultaneously demodulate and estimate the directions of arrival of signals by the antennas at the different frequencies. The different sets of antennas from which the received signals are provided for coding and multiplexing are selectively varied in accordance with the estimated directions of arrival and estimated magnitudes.

19 Claims, 5 Drawing Sheets

DIRECTION FINDING SYSTEM AND METHOD

BACKGROUND OF THE INVENTION

The present invention generally pertains to electronic direction finding systems and methods and is specifically directed to determining the direction of arrival of a received signal.

A prior art direction finding system for determining the direction of arrival at a particular location of signals received by a plurality of antennas that are arrayed in a known pattern in relation to the particular location is described in U.S. Pat. No. 6,384,784 B1. This prior art system includes an array of antennas in a predetermined configuration for receiving a signal from a modulated, or interfering, signal source. The individual outputs from each antenna are input to respective direct sequence spread spectrum modulators where each is multiplied by a unique pseudo-random number code, unique either in value or in time relationship. The spread spectrum outputs are summed and the summed output is demodulated and digitized to produce a digitized intermediate frequency (IF) signal. The digitized IF signal is processed by a digital signal processor to determine the relative phase or time of arrival of the signal from the modulated signal source at each antenna relative to one of the antennas used as a reference. The relative phases or times of arrival and the predetermined configuration of the antenna array are then used to estimate the direction of arrival from the modulated signal source.

SUMMARY OF THE INVENTION

In one aspect, the present invention provides a direction finding system for determining the direction of arrival at a particular location of signals received by a plurality of antennas that are arrayed in a known pattern in relation to the particular location, the system comprising: means for coding signals provided by at least some of the plurality of arrayed antennas in response to receipt of the signals within a predetermined band of frequencies; means for combining coded signals from different sets of less than all of the plurality of arrayed antennas to provide an analog combined signal; means for down-converting the frequency band of the analog combined signal; means for converting the down-converted analog combined signal to a digital signal representative of the combined coded signals; means for processing the digital signal to derive signals from the plurality of signals respectively provided by the different sets of less than all of the plurality of arrayed antennas; signal processing means for processing the derived signals to determine the directions of arrival of the signals that are received by each set of antennas; and means for selecting the different sets of antennas from which the received signals are provided for said coding and combination; wherein the signal processing means include: (a) means for processing the derived signals individually to estimate the directions of arrival of signals within said predetermined band of frequencies received by the respective antennas of each set; (b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies.

By combining coded signals from different sets of less than all of the plurality of arrayed antennas, the present invention addresses a problem attendant to the direction finding system described in U.S. Pat. No. 6,384,784 B1, wherein multiplex interference between the spread spectrum signals increases with an increase in the number of spread spectrum signals that are summed and provided to the single receiver for demodulation. Such multiplex interference degrades direction of arrival estimation, signal detection, and signal demodulation performance. Accordingly, such multiplex interference restricts the number of antennas and the total space of potential antenna geometries that can be utilized in the direction finding system described in U.S. Pat. No. 6,384,784 B1 to detect and process signals in an unknown received signal environment.

By judiciously selecting the different sets of antennas prior to coding and combination, the present invention enables selection of antenna sets of limited size to reduce multiplex interference while enabling different sets of antennas to be selected to provide a flexible variety of geometries for detecting a large variety of signals in an unknown received signal environment.

The present invention utilizes this antenna set selection flexibility to accomplish, among other things, the goals of: (1) signal detection, (2) simultaneous signal demodulation and estimation of directions of arrival, and (3) characterization and de-cluttering of complicated signal environments.

In another aspect, the present invention provides a direction finding system for determining the direction of arrival at a particular location of signals received by a plurality of antennas that are arrayed in a known pattern in relation to the particular location, the system comprising: signal processing means for determining said direction of arrival by processing a plurality of signals derived from signals provided by different sets of less than all of the plurality of arrayed antennas in response to receipt of the signals within a predetermined band of frequencies, wherein the signal processing means includes: (a) means for processing the derived signals individually to estimate the directions of arrival of signals within said predetermined band of frequencies received by the respective antennas of each set; (b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies; wherein the (b) means includes: (d) means for processing the derived signals individually to provide amplitude and phase estimates for signals within said predetermined band of frequencies received by the respective antennas of each set; (e) means for applying complex weighting factors to the amplitude and phase estimates of the derived signals for which a direction of arrival is estimated pursuant to step (a) to compensate for phase differences in the signals derived from different antennas of a said set of antennas and summing the weighted amplitude and phase estimates to provide a directional-beam-pattern for the combination of signals received by the set of antennas; and (f) means for processing the directional beam pattern to estimate the magnitude of the signal being received by the set of antennas.

In still another aspect, the present invention provides a direction finding system for determining the direction of arrival at a particular location of signals received by a plurality of antennas that are arrayed in a known pattern in relation to the particular location, the system comprising: signal processing means for determining said direction of arrival by processing a plurality of signals derived from signals provided by different sets of less than all of the plurality of arrayed antennas in response to receipt of the signals within a predetermined band of frequencies, wherein the signal processing means includes: (a) means for processing the derived signals individually to estimate the directions of arrival of signals within said predetermined band of frequencies received by the respective antennas of each set; (b) means for processing derived signals for which a direction of arrival is estimated pursuant to step (a) to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies; wherein the (a) means includes: (d) means for processing the derived signals individually to provide amplitude and phase estimates for signals within said predetermined band of frequencies received by the respective antennas of each set; and (e) means for forming received N-tuples containing the amplitude and phase estimates for the respective received signals within said predetermined band of frequencies; and (f) means for processing the received N-tuples in accordance with a minimum distance algorithm in relation to a database of N-tuples corresponding to different directions of arrival at different frequencies to estimate the directions of arrival of the signals within the predetermined band of frequencies that are received by each antenna of each set of antennas at each of said different frequencies.

In yet another aspect, the present invention provides a direction finding system for determining the direction of arrival at a particular location of signals received by a plurality of antennas that are arrayed in a known pattern in relation to the particular location, the system comprising: signal processing means for determining said direction of arrival by processing a plurality of signals derived from signals provided by different sets of less than all of the plurality of arrayed antennas in response to receipt of the signals within a predetermined band of frequencies, wherein the signal processing means includes: (a) means for processing the derived signals individually to estimate the directions of arrival of signals within said predetermined band of frequencies received by the respective antennas of each set; (b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies; in combination with: means for processing the estimated magnitudes of the signals received at said different frequencies by different sets of less than all of the plurality of arrayed antennas to determine whether a said received signal is of a sufficient magnitude to be of interest; and means for demodulating said received signal that is determined to be of interest.

The present invention also provides methods respectively directed to the combinations of functions performed by use of the systems of the different aspects of the present invention.

The present invention further provides a computer readable medium for use with one or more computers in the signal processing means of the direction finding system according to the first above-described aspect of the present invention, wherein the computer readable medium contains program instructions for causing the signal processing means to perform the signal processing steps in the first above described aspect of the present invention.

The present invention still further provides a computer readable medium for use with one or more computers in the signal processing means of the direction finding system according to the second above-described aspect of the present invention, wherein the computer readable medium contains program instructions for causing the signal processing means to perform the signal processing steps in the second above described aspect of the present invention.

Additional features of the present invention are described with reference to the detailed description of the preferred embodiments.

DETAILED DESCRIPTION

Figure 1:
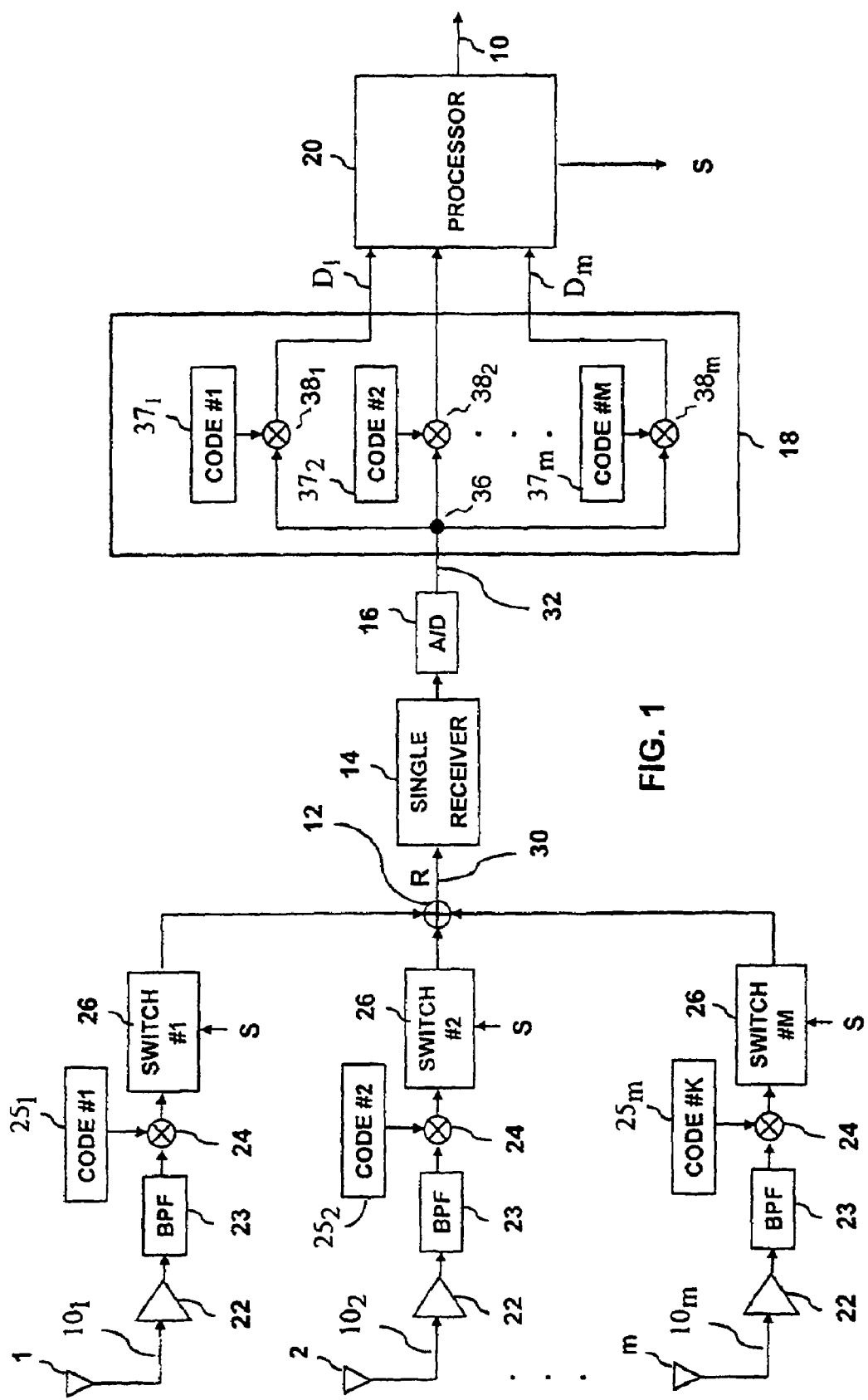
FIG. 1 is a diagram of an embodiment of a direction finding system according to the present invention.

Referring to FIG. 1, one embodiment of a direction finding system according to the present invention for determining the direction of arrival of signals at a particular location includes an array of antennas 1, 2, . . . , m; a plurality of receive channels $10_1$, $10_2$, . . . , $10_m$ respectively coupled to the antennas 1, 2, . . . , m; a signal combiner 12, a receiver 14, an analog-to-digital converter (A/D) 16, a signal derivation unit 18 and a signal processor 20. The plurality of antennas 1, 2, . . . , m are arrayed in a known pattern in relation to the particular location. Each of the receive channels $10_1$, $10_2$, . . . , $10_m$ includes a low noise amplifier (LNA) 22, a band-pass filter (BPF) 23, a mixer 24, a code source $25_1$, $25_2$, . . . , $25_m$ and a switch 26.

The number of antennas 1, 2, . . . , m in the antenna array and the particular configuration of the array are not constrained. The antenna aperture distance may be larger than one-half the wavelength of a particular signal. Circular arrays may confer digital signal processing advantages over linear-type arrays. The antenna elements may be omni-directional or directional.

Inclusion of the band-pass filter 23 in the receive channel 10 is not absolutely necessary. However, in wideband applications the band-pass filter 23 improves the direction finding performance of the system. A band-pass filter 23 that covers only a particular wideband spectrum of interest improves system performance.

The switches 26 are controlled by an antenna selection signal S provided either by the signal processor 20 or by an operator of the system. The antenna selections signal S indicates which of the switches 26 are selected to enable a signal to pass through its respective receive channel $10_1$, $10_2$, . . . , $10_m$ to the signal combiner 12 from the antenna 1, 2, . . . , m to which the receive channel $10_1$, $10_2$, . . . , $10_m$ is coupled.

The signals provided within the receive channels $10_1$, $10_2, \ldots, 10_m$ by the antennas $1, 2, \ldots, m$ in response to receipt of the signals within a predetermined band of frequencies, as determined by the band-pass filter 23, are diversely coded for combination by the signal combiner 12 so that they can be down-converted together by a single receiver 14 and subsequently separated for further processing. The code sources $25_1, 25_2, \ldots, 25_m$ provide different codes for each of the receive channels $10_1, 10_2, \ldots, 10_m$.

The band-pass filter 23 eliminates any out-of-bound energy immediately prior to coding the received signal.

The code provided by the code sources $25_1, 25_2, \ldots, 25_m$ is a maximum length sequence (M-sequence) binary code. This binary code is chosen for optimal auto-correlation, cross-correlation, and spectral characteristics. The identical M-sequence binary code is used for every receive channel $10_1, 10_2, \ldots, 10_m$. However, the applied timing phase of this identical M-sequence is unique for each receive channel $10_1, 10_2, \ldots, 10_m$. The number of phase differences available, or equivalently the number of spread receive channels possible, is equal to the M-sequence binary code length.

The unique timing phases of the common M-sequence are used to de-correlate each receive channel $10_1, 10_2, \ldots, 10_m$ by the signal derivation unit 18. The chip (modulation symbol) timing alignment does not need to be time synchronous across each all of the receive channels $10_1, 10_2, \ldots, 10_m$.

The use of a common binary M-sequence simplifies the design of the receive channels. The M-sequence can be used this way (as opposed to wireless spread spectrum applications) because the RF architecture of the receive channels is static and maintains M-sequence phase relationships.

The combined auto-correlation, cross-correlation, and spectral properties of the M-sequence are believed to provide advantages over Gold codes, product codes, Kasami codes, or M-sequence derivative codes.

The signal in the receive channel $10_1, 10_2, \ldots, 10_m$ is coded by being mixed by the mixer 24 with the code provided by the respective code source $25_1, 25_2, \ldots, 25_m$. The code sources $25_1, 25_2, \ldots, 25_m$ may be either static or dynamic.

In the prior art, code division multiplexing commonly applies spreading codes to digital symbol data in an encoder before transmission, wherein the digital symbol data is known a priori to the encoder and the data is constant for some duration of the spreading code. In the preferred embodiment of the direction finding system of the present invention, known digital data is not spread, but rather unknown analog receive radio frequency (RF) signals plus unknown analog noise from an antenna source are spread.

The code multiplexed signal 30 received at the single receiver 14 is represented as $$R_i = \sum_{i=1}^{m} (X_i + N_i) C_i \qquad [\text{Eq. 1}]$$

Where $X_i$ is the unknown antenna signal from the i'th receive channel, $N_i$ is the unknown noise from the i'th receive channel, and $C_i$ is the i'th M-sequence.

The derived signal $D_1$ provided by the signal derivation unit 18 is represented as $$D_1 = (X_1 + N_1) + \sum_{i=2}^{m} X_i C_i C_i + \sum_{i=2}^{m} N_i C_i C_i \qquad [\text{Eq. 2}]$$

M-sequences provide combined system advantages compared to other codes that can be used in alternative embodiments, such as Gold codes, Kasami codes, or general product codes. In the system of the present invention, M-sequences mitigate (but do not remove) the signal and noise cross-correlation terms in Equation 2, while providing optimal auto-correlation and spectral properties. Since the present invention uses a common M-sequence, differing in phase only for the i'th channel, the number of available channels is not severely restricted for a given M-sequence size as encountered in wireless applications where the M-sequence phase cannot be directly controlled at the receiver.

Let $T_C$ represent the time duration of a single M-sequence modulation symbol (also called a chip) as applied at the mixer 24. The preferred M-sequence modulation rate $$\frac{1}{T_c}$$

is maximized to mitigate the impact of the signal and noise cross-correlation terms in EQ (2), subject to the constraints of the bandwidth of the single receiver 14.

In alternative embodiments, orthogonal codes such as Walsh codes can be utilized to completely remove the noise and signal cross-correlation terms in Equation 2 when spreading unknown receive signal and unknown noise. However, orthogonal codes are not preferred for many practical applications. Orthogonal codes have strong frequency dependencies (not spectrally "white" as with M-sequences) which can degrade the performance of down-conversion in the single receiver 14 and the algorithms processed in the processor 20. More importantly, to completely remove the cross-correlation terms in Equation 2 when using orthogonal codes, high modulation rates are required. If the bandwidth of the unknown signal plus noise from the band pass filter (BPF) 23 is $BW_{in}$, then the modulation rate should generally satisfy the following relation, for values of K>40, and where $N_C$ represents the number of integrated orthogonal code chips:

$$\frac{1}{T_c} \geq K(N_c)(BW_{in}) \qquad [\text{Eq. 3}]$$

For example, in a narrowband application where $BW_{in}$ equals 64 KHz and $N_C$ equals 32 chips, the approximate removal of cross-correlation terms requires a mixing modulation rate of 81.92 MHz. This result effectively restricts the practical use of orthogonal codes to strictly narrowband applications for the present invention.

The present invention does not require individual chip time alignment for each receive channel in the signal combiner 12 using the preferred M-sequences. Orthogonal codes require the added system complexity of chip time alignment in the signal combiner 12.

In each receive channel 10, the mixer 24 spreads the data in the signal from the antenna with a predetermined binary code and spreading modulation. Such spreading can be accomplished by using either bi-phase or quad-phase modulation.

Different sets of antennas 1, 2, ..., m, from which the received signals are provided for coding and combination, are selected in accordance with the content of the antenna selection signal S provided to the switches 26 by the signal processor 20. Although the switches 26 are shown in FIG. 1 as being located between the mixer 24 and the signal combiner 12, the switches 26 may be located at other positions within the receive channels $10_1, 10_2, \ldots, 10_m$ When the switches 26 are located at the mixer 24 or at some location between the antenna 1, 2, ..., m and the mixer 24, signals from different sets of less than all of the plurality of arrayed antennas 1, 2, ..., m are coded for combination by the signal combiner 12. If the switches are located at the mixer 24, a specific modulation state (zero voltage) at the mixer 24 turns off the energy in the receive channel 10.

The different antenna sets are selected to have different geometries relative to signals received at different directions of arrival. This flexibility in antenna selection before the coded signals are combined enhances resolution of the signal parameters and of separate different signals by the processor 20. The selection of different antenna sets from the main antenna array thereby provides different "space diversity views" in that the geometric spacing and orientation of each selected antenna set is different and confers advantages for certain signal directions of arrival and/or modulation types.

Although a selected set of antennas 1, 2, ..., m typically includes three antennas to resolve directions-of-arrival ambiguities, more or less than three antennas may be selected for a one or more sets. The selection signal S provided by the signal processor 20 is initialized by a system operator so that each of the antennas 1, 2, ..., m is included in one or more of the selected sets. While signals are being received, the selection signal S is varied by the processor 20 to adapt the selection of the antenna sets in accordance with the parameters of the received signals.

The signal combiner 12 combines coded signals from different sets of less than all of the plurality of arrayed antennas to provide an analog combined signal 30. In some embodiments the signal combiner 12 combines the coded signals by time division multiplexing (TDM) the coded signals. In alternative embodiments other signal combining techniques are used. In the preferred embodiment, the signals in the different receive channels are simultaneously combined by code division multiplexing.

Simultaneous channel multiplexing allows detection and direction finding of signals of interest with suppressed carriers such as those with a single sideband.

The adaptive selection of different sets of antennas allows individual signals of interest to be analyzed from favorable aperture orientations relative to wave-front vector directions, and further provides a minimally sufficient number of signals from different receive channels for a general signal-of-interest determination and direction of arrival estimation, while also reducing potential multiplex interference.

The receiver 14 is a single wideband receiver, which filters the desired spectrum and down-converts the frequency band of the analog combined signal 30 to an intermediate frequency; and the analog-to-digital converter 16 converts the down-converted analog combined signal 31 to a digital signal 32 representative of the combined coded signals. Narrow and wideband processing of the signals from the receive channels $10_1, 10_2, \ldots, 10_m$ are available when using M-sequence code spreading. Wideband spectrum processing allows multiple signals of interest detection and direction finding simultaneously.

The signal derivation unit 18 processes the digital signal 32 to derive signals $D_1, D_2, \ldots, D_m$ from the plurality of signals respectively provided by the different sets of less than all of the plurality of arrayed antennas 1, 2, ..., m. The signal derivation unit 18 includes a de-multiplexer 36, a plurality of code sources $37_1, 37_2, \ldots, 37_m$ and a corresponding plurality of multipliers $38_1, 38_2, \ldots, 38_m$. The code sources $37_1, 37_2, 37_m$ contain codes corresponding to, and preferably matching the codes provided by the code sources $25_1, 25_2, \ldots, 25_m$ in the receive $10_1, 10_2, \ldots, 10_m$.

The portions of digital signal 32 that are representative of different coded signals are separated by the de-multiplexer 36 and then multiplied by the respective multipliers $38_1, 38_2, \ldots, 38_m$ with the different codes respectively provided by the different code sources $37_1, 37_2, \ldots 37_m$ to provide the derived signals $D_1, D_2, \ldots,$ DM. Such multiplication is chip synchronized and the codes provided by the code sources $37_1, 37_2, \ldots, 37_m$ are phase synchronized with the M-sequence. This process is known as receive channel de-correlation. The necessary timing alignments can be achieved without a priori timing information using standard spread spectrum auto-correlation techniques.

The total bandwidth of the spread signal plus noise from mixer 24 can be marginally larger (possibly up to a factor of 1.3) than the total receive channel bandwidth of the down-converting receiver 14, provided that the de-correlation M-sequence in the signal derivation unit 18 matches the system transform function of the modulating M-sequence as filtered through the down-converting receiver 14. The code modulation rate at mixer 24 is optimized to reduce cross-correlation terms in a derived signal, while not losing an excessive amount of spread signal energy through the filtering process of the receiver 14.

The signal processor 20 determines the directions of arrival of the signals received by the array of antennas 1, 2, ..., m by processing the plurality of signals $D_1, D_2, \ldots, D_m$ derived from the signals provided by different sets of less than all of the plurality of arrayed antennas 1, 2, ..., m in response to receipt of the signals within the predetermined band of frequencies determined by the band-pass filters 23.

The signal processor 20 is adapted for performing the steps of; (a) processing the derived signals $D_1, D_2, \ldots, D_m$ to estimate the directions of arrival of the signals that are received by each selected set of antennas 1, 2, ..., m; (b) processing the estimated directions of arrival to select the different sets of antennas 1, 2, ..., m from which the received signals are provided for coding and combination; and (c) processing the signals derived in accordance with such selection to determine the directions of arrival of the signals. The selection signal S provided by the signal processor 20 is initialized prior to the receipt of any signals to select the different sets of antennas 1, 2, ..., m and then modified in accordance with the estimated directions of arrival of the signals that are being received.

At least a portion of the signal processor 20 is embodied in one or more computers, one or more of which computers may be shared by at least part of the signal derivation unit 18. A computer readable medium, which is provided for use with the computer(s), contains program instructions for causing the computer to perform one or more functions of the processor 20. As used herein, the term computer readable medium is not limited to one computer readable medium, but may also be interpreted to mean a plurality of computer readable media.

Figure 2:
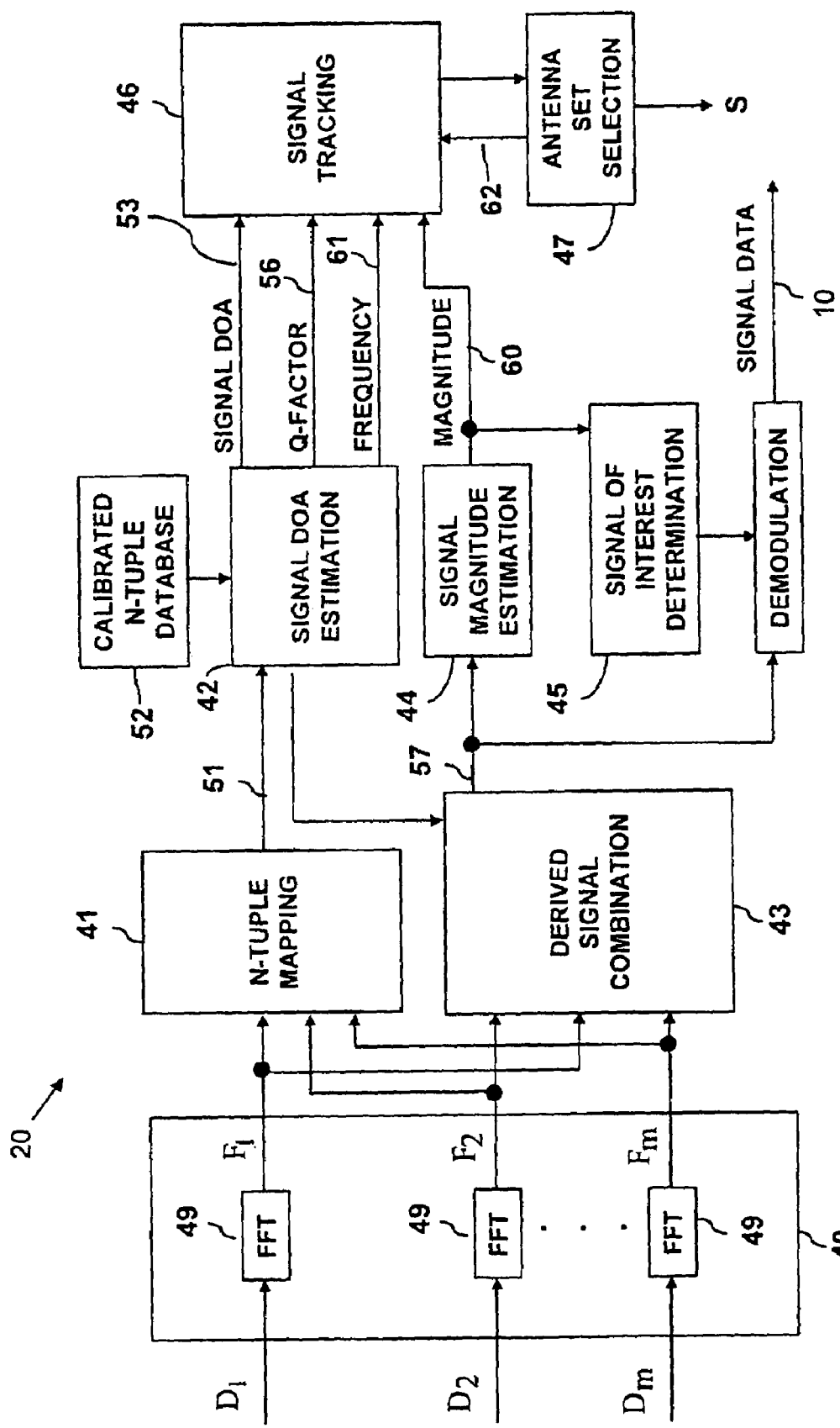
FIG. 2 is a diagram illustrating certain processing routines performed by the processor in the system shown in FIG. 1.

Referring to FIG. 2, the signal processor 20 is adapted for performing the routines of frequency channelizing 40, N-tuple mapping 41, signal direction-of-arrival (DOA) estimation 42, derived signal combination 43, signal magnitude estimation 44, potential signal of interest determination 45, signal tracking 46, antenna-set selection 47, and demodulation 48.

Pursuant to the frequency-channelizing routine 40, the derived signals $D_1, D_2, D_m$ are individually processed by Fast Fourier Transforms (FFT) 49 to provide derived signals $F_1, F_2, \ldots, F_m$ that contain amplitude and phase estimates for signals within the predetermined band of frequencies received by the respective antennas 1, 2, . . . , m of each selected set of antennas. FFT processing is used for individual signal-of-interest integration and frequency band filtering.

Pursuant to the N-tuple mapping routine 41, the amplitude and phase estimates $F_1, F_2, \ldots, F_m$ are processed to form received N-tuples 51 containing the amplitude and phase estimates within the predetermined band of frequencies. An N-tuple is a finite sequence of N objects, each of a specified type. The N-tuple structure can be a linear or a non-linear function of individual FFT value and the vector dimension of the N-tuple does not necessarily match the number of derived channel signals.

The combined mapping of phase and amplitude to an N-tuple is more applicable to antenna arrays with directional antennas. However, amplitude information may also be useful for systems with omni-directional antennas when parasitic coupling and other unanticipated system-wide electrical phenomena influence the amplitude response of the system.

Use of N-tuples permits a quick method of estimating a direction of arrival (DOA) when using circular antenna arrays. Use of calibrated N-tuples also provides better noise-sensitivity performance compared to standard inverse-tangent angle solution methods. The N-tuple methodology of the present invention provides a type of correlation receiver employed for direction finding. It is believed that calibrated correlation receivers for direction finding yield performance characteristics comparable to maximum likelihood designs.

Use of N-tuples permits a quick method of estimating a direction of arrival (DOA) when using circular antenna arrays. Use of calibrated N-tuples also provides better noise-sensitivity performance compared to standard inverse-tangent angle solution methods.

Pursuant to the signal direction-of-arrival (DOA) estimation routine 42, the received N-tuples 51 are processed in accordance with a minimum distance algorithm in relation to a database of calibrated N-tuples 52 corresponding to different directions of arrival (DOA) at different frequencies to thereby estimate the directions of arrival of the signals within the predetermined band of frequencies that are received by each antennas 1, 2, . . . , m of each selected set of antennas at each of the different frequencies by identifying the closest matching calibrated N-tuples. Preferably, the minimum distance algorithm is a non exhaustive algorithm that estimates Euclidian distances for a plurality of calibrated N-tuple solutions. The identified closest matching N-tuple in the calibrated N-tuple database 52 provides a direction of arrival (DOA) estimate 53 for a given frequency.

Figure 3:
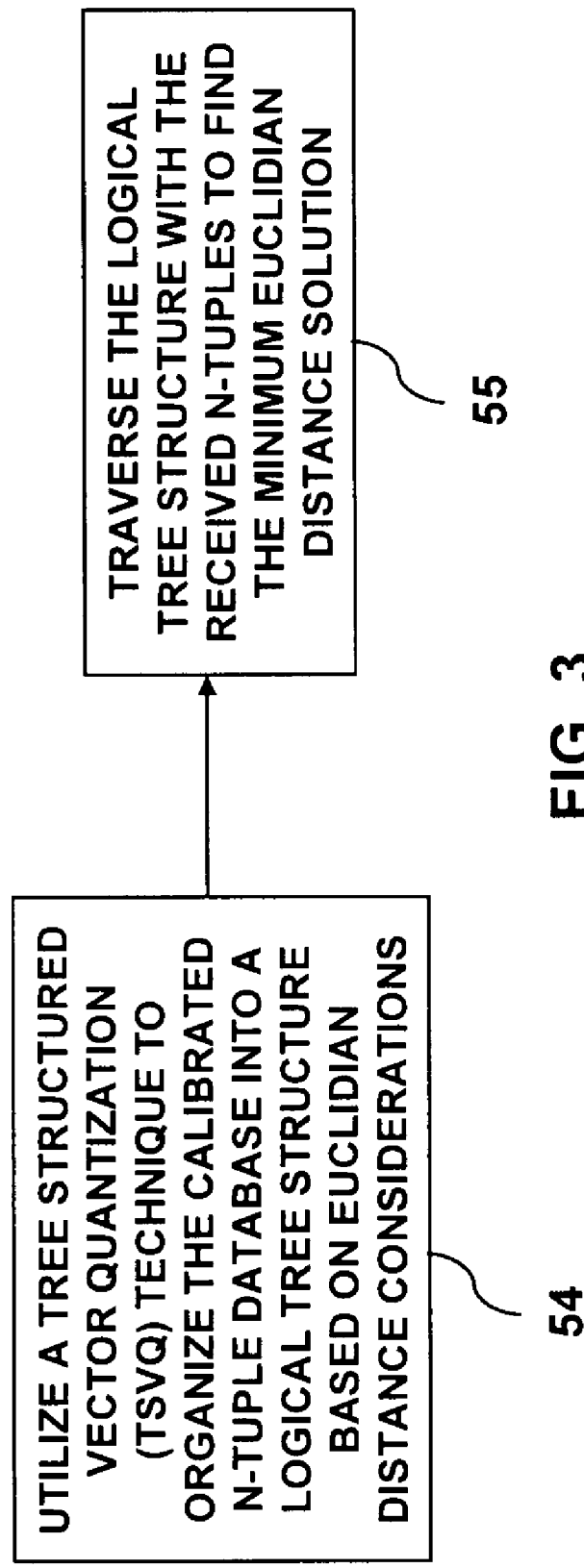
FIG. 3 is a diagram of sub-routines included the signal direction-of-arrival (DOA) estimation routine shown in FIG. 2.

Referring to FIG. 3, in a preferred embodiment the non exhaustive minimum distance algorithm utilizes a tree structured vector quantization technique to perform a sub-routine 54 of organizing the calibrated N-tuple database 52 into a logical tree structure based on Euclidian distance considerations and then performing a sub-routine 55 of traversing the logical tree structure from a root node with the received N-tuples 51 to find a minimum Euclidian distance solution. This technique is analogous to general methods used in signal and image compression, and which is described in U.S. Pat. No. 5,077,798 and U.S. Pat. No. 5,892,847. Vector quantization is described in U.S. Pat. No. 4,670,851 and U.S. Pat. No. 5,396,625

The set of calibrated N-tuples in the database 52 is analogous to what is referred to as a codebook. The calibrated N-tuples are organized by the tree structured vector quantization (TSVQ) as a codebook of codewords representing the calibrated N-tuple space advantageously, wherein (a) the number of codewords is usually less than the number of calibrated N-tuples, (b) the set of codewords in the codebook are organized in a logical tree structure with respect to Euclidian distance that significantly reduces the search time when mapping a received N-tuple to a codeword solution, and (c) the average Euclidian difference (called distortion in signal and image compression), between the set of calibrated N-tuples and their corresponding codewords, is globally minimized.

In alternative embodiments exhaustive minimum distance algorithms can be used to compute the Euclidian distance metric by matching the received N-tuples 51 with all members of the set of calibrated N-tuples to identify the closest matching N-tuple in the calibrated N-tuple database 52. For some practical applications, the complete set of calibrated N-tuples in the database 52 is necessarily large, and accordingly, exhaustive algorithms may be computationally prohibitive. For example, to maintain I degree of DOA accuracy across 360 degrees of azimuth and 45 degrees of elevation, the calibrated N-tuple database size becomes 360*45*1=16200 N-tuples.

The preferred tree structured vector quantization (TSVQ) technique significantly reduces the computational requirements of the exhaustive technique, while minimizing the average calibrated N-tuple to codeword distance error.

The direction-of-arrival estimation routine 42 also estimates a Q-factor (a quality-of-fit metric 56 analogous to a signal-to-noise ratio estimate) correlated to the estimated directions of arrival (DOA). The estimated Q-factor is the Euclidian distance between the N-tuple 51 provided by the N-tuple mapping routine 41 and the closest matching codeword in the database 52

In some antenna array geometries where an aperture is wide relative to the signal of interest wavelength, the use of N-tuples can efficiently resolve angle ambiguities. Minimum distance algorithm estimates are particularly efficient for circular antenna arrays.

The calibrated N-tuples in database 52 are initially obtained by a calibration procedure that is conducted in a radio frequency (RF) shielded lab. Each N-tuple codeword in the database 52 corresponds to a unique signal frequency and a corresponding direction of arrival (DOA) relative to the arrayed antennas 1, 2, . . . , m. The calibrated N-tuples are generated by radiating the system in the RF lab with unique transmitted frequencies and/or modulations across variable ranges of azimuth and/or elevation. Elevation information may be encapsulated in the calibrated N-tuple with amplitude information used in the frequency-channelizing routine 40. The calibrated N-tuples are digitally collected in the database 52 during this calibration procedure.

This calibration procedure (a) allows wideband calibration data to be efficiently represented and stored in the N-tuple database 52, (b) allows calibration data to be stored conveniently as a function of signal frequency, azimuth and elevation, (c) allows visualization and system performance metrics of the "RF tuning" state of the direction finding system to be readily computed and (d) allows the antenna set selection to be adaptively tuned until the desired N-tuple distribution is achieved.

The different antennas in a given set of antennas receive signals at different phases in accordance with the different directions of arrival of the signals received by the individual antennas of the set.

Pursuant to the derived signal combination routine 43, the amplitude and phase estimates of the derived signals $F_1$, $F_2, \ldots, F_m$, for which a direction of arrival is estimated by the direction-of-arrival estimation routine 42, are processed to form a directional beam pattern 57 by compensating for these phase differences and summing the resultant phase coherent derived signals $F_1, F_2, \ldots, F_m$, for which a direction of arrival is so estimated.

Figure 4:
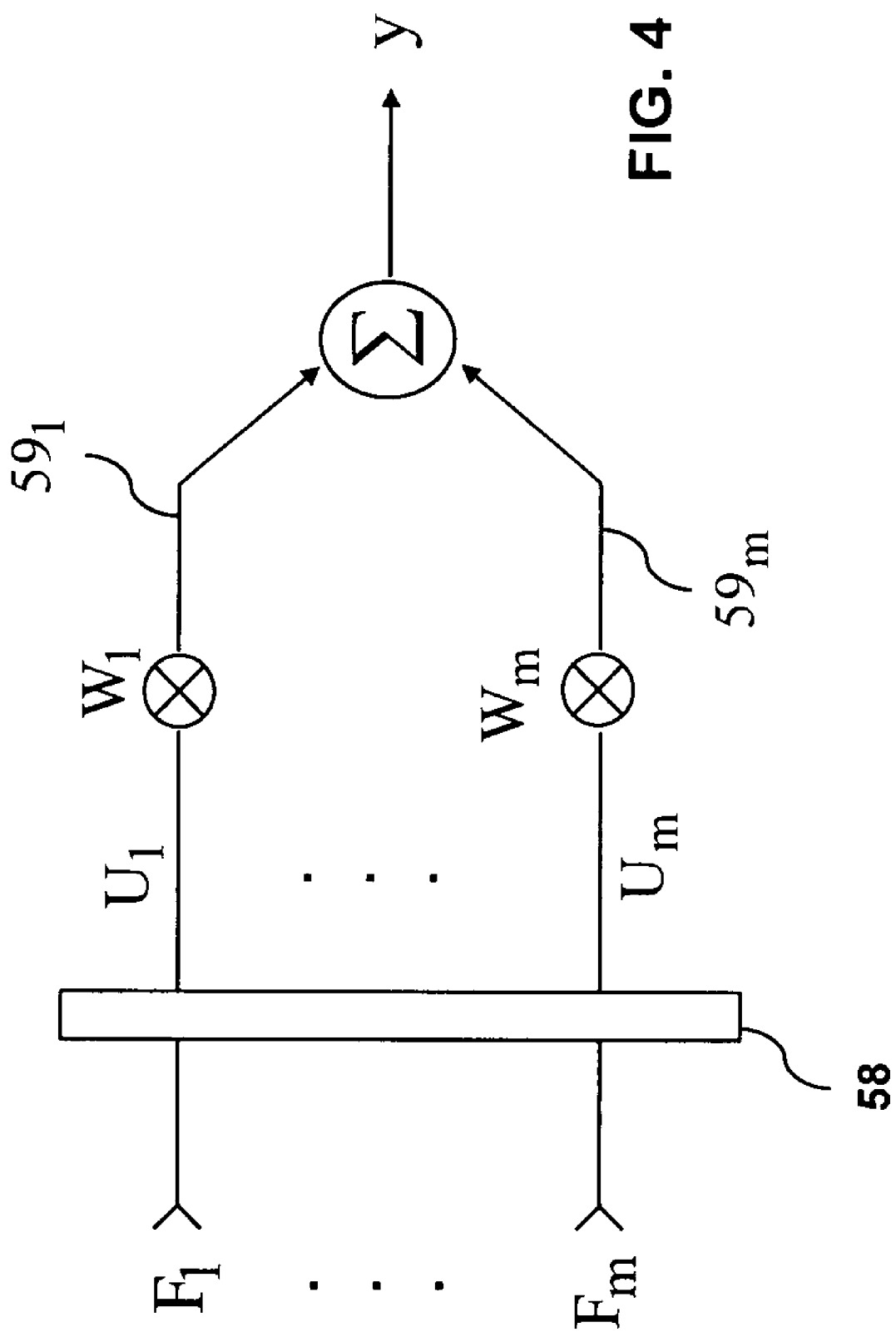
FIG. 4 is a diagram of a directional beam pattern forming sub-routine included in the derived signal combination routine shown in FIG. 2.

Referring to FIG. 4, in accordance with the content of the antenna selection signal S, a gated logic array 58 passes only the phase and amplitude estimates $u_1, \ldots, u_m$ of the signals $F_1$, $F_2, \ldots, F_m$ that are derived from signals received by the selected set of antennas; and the directional beam pattern 57 is formed by applying complex weighting factors $w_1, \ldots w_2$ to the amplitude and phase estimates $u_1, \ldots, u_m$ of the derived signals $F_1, \ldots, F_m$ and by summing the weighted amplitude and phase estimates $59_1, \ldots, 59_m$ in accordance with the following delay-and-sum method in which the output vector y(k) of the directional beam pattern 57 is the sum of the resultant phase coherent derived signals $F_1, \ldots, F_m$.

$$y(k) = \sum_{i=1}^{m} w_i u_i = w^H u(k) \quad \text{[Eq. 4]}$$

The total output power of the directional beam pattern 57 is:

$$P = E[|y(k)|^2] = E[|w^H u(k)|^2] = w^H R_{uu} w \quad \text{[Eq. 5]}$$

where $R_{uu}$ is the autocorrelation matrix of the input data vector $u = [u_1\ u_2\ \ldots\ u_m]$ Pursuant to the signal magnitude estimation routine 44, the output vector y(k) of the directional beam pattern 57 is processed by the routine 44 to estimate the magnitude 60 in the direction of the beam pattern 57 of the signal received by each of the different sets of antennas at the different individual frequencies within the predetermined band of frequencies at which signals are being received. The estimated magnitude 60 is by calculating the absolute magnitude (modulus) of the output vector y(k).

Pursuant to the potential signal-of-interest determination routine 45, the estimated magnitudes 60 of the signals received at the different frequencies by the different sets of less than all of the plurality of arrayed antennas are processed to determine whether a received signal is of a sufficient magnitude to be of interest. When it is determined pursuant to routine 45 that the received signal is of a sufficient magnitude to be of interest, the processor 20 performs the signal tracking routine 46.

Pursuant to the signal tracking routine 46, the estimated directions of arrival (DOA) 53, the correlated DOA Q-factors 56, the estimated magnitudes 60, the respective frequency values 61 and identifications 62 of the respective sets of antennas for the signals of interest received at the different frequencies at the estimated directions of arrival by the different sets of antennas are processed to determine estimates of the direction of arrival of signals received by the different sets of antennas at individual frequencies of the different frequencies.

The signal tracking routine 46 also declutters complicated signal environments across a wideband spectrum and tracks wideband signals, such as frequency hopped signals.

Figure 5:
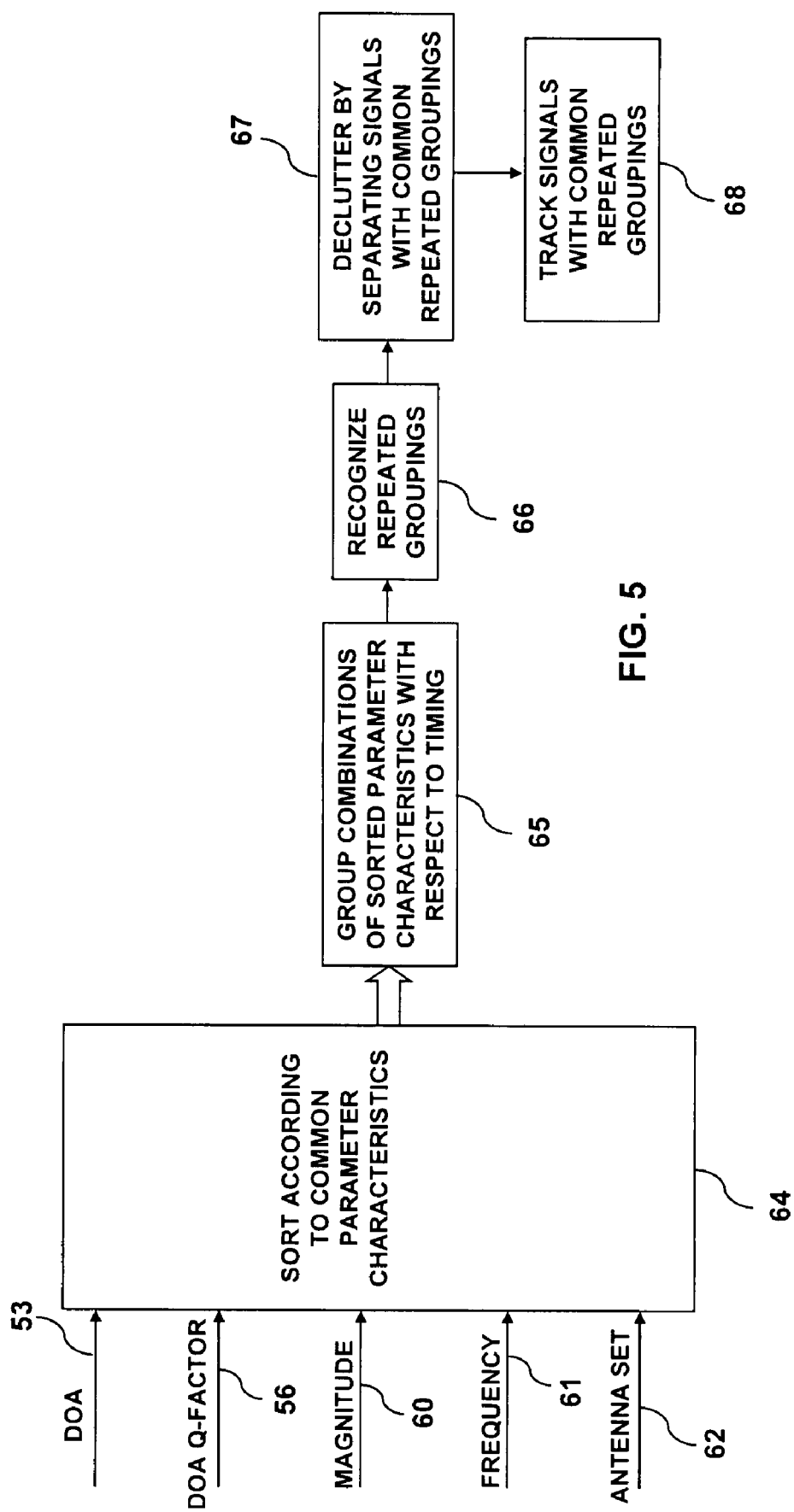
FIG. 5 is a diagram of sub-routines included in the tracking routine shown in FIG. 2.

Referring to FIG. 5, the signal tracking routine 46 includes a sorting sub-routine 64, a grouping sub-routine 65, a recognition sub-routine 66, a declutter sub-routine 67 and a tracking sub-routine 68.

Pursuant to the sorting sub-routine 64, the processor 20 sorts the parameters of direction of arrival (DOA) 53, Q-factor 56, signal magnitude 60, respective frequency 61 and antenna set identification 62 for the signals received at the different frequencies by the different sets of antennas. Each identified antenna set has a unique configuration. These parameters 53, 56, 60, 61, 62 are sorted in accordance with common parameter characteristics, such as the same frequency, the same direction of arrival, etc. and stored across a common time history.

Pursuant to the grouping sub-routine 65, processor 20 groups combinations of the sorted parameter characteristics that occur together by developing average statistics and computing histograms of specific data views, such as DOA vs. frequency, DOA vs. magnitude or Q-factor, SOIs vs. magnitude, antenna set identification (configuration) vs. DOA, antenna set identification (configuration) vs. magnitude, etc.

Pursuant to the recognition sub-routine 66, processor 20 recognizes the histograms for the groups of combinations that are repeated over a predetermined time period.

Pursuant to the declutter sub-routine 67, the processor separates signals with common repeated groupings, as recognized by the sub-routine 66 to thereby declutter complicated signal environments across a wideband spectrum. For example, a frequency hopped signal (an agile signal) can hop around to different frequencies over time, but may continuously reside at the same direction of arrival relative to the arrayed antenna of the direction finding system. When the signal parameters are sorted into common DOA "clusters", a hopped signal can be uniquely identified because the hopped signal resides in the same DOA cluster, and probably at the same general magnitude, even though it exists at different frequencies over time. A signal associated with multiple frequencies, as recognized pursuant to the subroutine 66 can then be "removed" from consideration when characterizing the remaining signals in the same environment.

For another example of decluttering, two different signals in the same general frequency range but transmitted from different locations interfere with each other in frequency space. However, because these two different signals are received at different directions of arrival, they can be recognized as separate signals pursuant to the recognition sub-routine 66 by observing that two distinct DOA groups form over time (especially after being viewed from different antenna selections), and thereupon be separated for further tracking and processing.

Pursuant to the tracking sub-routine 68, the processor 20, tracks both stationary and agile signals with common repeated groupings, as determined by the sub-routine 66 to thereby track wideband signals, such as frequency hopped signals.

Pursuant to the antenna-set-selection routine 47, the processor 20 processes the computed histograms of the parameters of the signals of interest that are tracked during the signal tracking routine 46 to select the different sets of antennas 1, 2, ..., m from which the signals $D_1, D_2, \ldots, D_m$ are derived, with said selection being implemented by modifying the content of the antenna selection signal S. The antenna-set-selection routine 47 selects different combinations of antennas having different geometries relative to the signals being received at the different directions of arrival.

The greater the number of receive channels 10 that are simultaneously multiplexed before the single receiver 14, the greater the amount of multiplex interference that can degrade the signal-of-interest detection and direction-finding performance. Accordingly, the antenna-set-selection routine 47 determines the minimal number of receive channels 10 required for simultaneous multiplexing in order to accomplish a specific signal-of-interest detection and direction-finding task, and thereby minimizes multiplex interference.

The flexibility of adaptively selecting channels before multiplexing also allows a system to efficiently employ different acquisition modes:

During an "initial acquisition" mode, a relatively large number of receive channels 10 are combined for a first-look of the signal environment and also for resolving angle ambiguities of signals of interest with small wavelengths relative to the array aperture.

During a "parameter refinement modes", a smaller number of receive channels 10 are combined in selected set of advantageously oriented antennas.

During a "scanning mode", sets of only two or three antennas are selected and these selected sets are continually commutated for multiplexing.

Alternative to the selection of the different sets of antennas pursuant to the antenna-set-selection routine 47, the computed histograms of the parameters of the signals of interest that are tracked during the signal tracking routine 46 are displayed on a monitor to the system operator, who examines the displayed histograms and selects the different sets of antennas 1, 2, . . . , m from which the signals $D_1, D_2, \ldots, D_m$ are derived, with said selection being implemented by the system operator causing the processor 20 to modify the content of the antenna selection signal S.

Pursuant to the tracking routine 46, the parameters of direction of arrival (DOA) 53, Q-factor 56, signal magnitude 57 provided by processing the signals $D_1, D_2, \ldots, D_m$ derived in accordance with such selection are processed to ultimately determine the directions of arrival of the signals received by the different sets of antennas at individual frequencies of the different frequencies.

The signal tracking routine 46 utilizes multiple information sources to process signal direction of arrival (DOA) estimates.

In one embodiment, the signal tracking routine 46 maintains a weighted running average of a time history of direction of arrival (DOA) estimates 53. Weighted running averages tend to reduce the statistical variance between the "true" signal direction of arrival (DOA) and the estimated direction of arrival (DOA). The preferred weighted running average uses a combined time history of both the Q-factors 56, each being analogous to a signal-to-noise (SNR) estimate, and the direction of arrival (DOA) estimates 53. Running averages that incorporate signal-to-noise (SNR) information for each data input may have better statistical variance properties compared to averages that do not incorporate this added information.

In another embodiment, the signal tracking routine 46 uses the signal magnitude 60 combined with the direction of arrival (DOA) estimate 53 to resolve angle ambiguities when the present antenna set selection geometry is larger than ½ the wavelength of a signal of interest. In this case, for any one signal of interest, there may exist multiple and distinct directions of arrival (DOA) estimates 53, all with equal Q-factors 56 as determined during the signal DOA estimation routine 42. The signal magnitude 60 will generally be largest in the direction of the directional beam pattern 57 that is formed for the true signal direction of arrival (DOA). This combined capability provides unambiguous direction of arrival (DOA) estimates across a greater frequency range for any one antenna set selection.

When a received signal that is determined to be of interest pursuant to the potential signal-of-interest determination routine 45 is tracked by the tracking routine 47, the directional beam pattern 57 of the received signal is demodulated pursuant to the demodulation routine 48 to thereby provide an output signal 10 containing the data transmitted in the received signal. Demodulation of a directional beam pattern 57 maximizes the chances of satisfactorily demodulating a signal at some DOA. A beam pattern improves the signal to noise ratio (SNR) of a signal being transmitted in the beam pattern direction.

The received signal can be simultaneously tracked and demodulated. For example, a soldier in the field can simultaneously listen to a voice signal from an enemy and understand the direction of arrival of the voice signal the soldier is currently hearing.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A direction finding system for determining the direction of arrival at a particular location of signals received by a plurality of antennas that are arrayed in a known pattern in relation to the particular location, the system comprising:
   means for coding signals provided by at least some of the plurality of arrayed antennas in response to receipt of the signals within a predetermined band of frequencies;
   means for combining coded signals from different sets of less than all of the plurality of arrayed antennas to provide an analog combined signal;
   means for down-converting the frequency band of the analog combined signal;
   means for converting the down-converted analog combined signal to a digital signal representative of the combined coded signals;
   means for processing the digital signal to derive signals from the plurality of signals respectively provided by the different sets of less than all of the plurality of arrayed antennas;
   signal processing means for processing the derived signals to determine the directions of arrival of the signals that are received by each set of antennas; and
   means for selecting the different sets of antennas from which the received signals are provided for said coding and combination;
   wherein the signal processing means include:
   (a) means for processing the derived signals individually to estimate the directions of arrival of signals within said predetermined band of frequencies received by the respective antennas of each set;

(b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies.

2. A system according to claim 1, wherein the signal processing means further include (d) means for processing the derived signals to estimate the directions of arrival of the signals that are received by each set of antennas;

(e) means for processing the estimated directions of arrival to select the different sets of antennas from which the received signals are provided for said coding and combination; and (f) means for processing the signals derived in accordance with said selection to determine said directions of arrival.

3. A system according to claim 1, wherein the (a) means includes the:

(d) means for processing the derived signals individually to provide amplitude and phase estimates for signals within said predetermined band of frequencies received by the respective antennas of each set; and (e) means for forming N-tuples containing the amplitude and phase estimates for the respective received signals within said predetermined band of frequencies; and (f) means for processing the N-tuples in accordance with a minimum distance algorithm in relation to a database of N-tuples corresponding to different directions of arrival at different frequencies to estimate the directions of arrival of the signals within the predetermined band of frequencies that are received by each antenna of each set of antennas at each of said different frequencies.

4. A system according to claim 1, wherein the coding means is adapted for coding the signals provided by different antennas with respectively different codes that have a common M-sequence for all of the antennas and different phases for the different antennas.

5. A direction finding system for determining the direction of arrival at a particular location of signals received by a plurality of antennas that are arrayed in a known pattern in relation to the particular location, the system comprising:

signal processing means for determining said direction of arrival by processing a plurality of signals derived from signals provided by different sets of less than all of the plurality of arrayed antennas in response to receipt of the signals within a predetermined band of frequencies, wherein the signal processing means includes:

(a) means for processing the derived signals individually to estimate the directions of arrival of signals within said predetermined band of frequencies received by the respective antennas of each set;

(b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies;

wherein the (b) means includes:

(d) means for processing the derived signals individually to provide amplitude and phase estimates for signals within said predetermined band of frequencies received by the respective antennas of each set;

(e) means for applying complex weighting factors to the amplitude and phase estimates of the derived signals for which a direction of arrival is estimated pursuant to step (a) to compensate for phase differences in the signals derived from different antennas of a said set of antennas and summing the weighted amplitude and phase estimates to provide a directional-beam-pattern for the combination of signals received by the set of antennas; and (f) means for processing the directional beam pattern to estimate the magnitude of the signal being received by the set of antennas.

6. A direction finding system for determining the direction of arrival at a particular location of signals received by a plurality of antennas that are arrayed in a known pattern in relation to the particular location, the system comprising:

signal processing means for determining said direction of arrival by processing a plurality of signals derived from signals provided by different sets of less than all of the plurality of arrayed antennas in response to receipt of the signals within a predetermined band of frequencies, wherein the signal processing means includes:

(a) means for processing the derived signals individually to estimate the directions of arrival of signals within said predetermined band of frequencies received by the respective antennas of each set;

(b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies;

wherein the (a) means includes the steps of:

(d) means for processing the derived signals individually to provide amplitude and phase estimates for signals within said predetermined band of frequencies received by the respective antennas of each set; and (e) means for forming received N-tuples containing the amplitude and phase estimates for the respective received signals within said predetermined band of frequencies; and (f) means for processing the received N-tuples in accordance with a minimum distance algorithm in relation to a database of N-tuples corresponding to different directions of arrival at different frequencies to estimate the directions of arrival of the signals within the predetermined band of frequencies that are received by each antenna of each set of antennas at each of said different frequencies.

7. A system according to claim 6, wherein the minimum distance algorithm includes the steps of:

(g) utilizing a tree structured vector quantization (TSVQ) technique to organize the calibrated N-tuple database into a logical tree structure based on Euclidian distance considerations; and (h) traversing the logical tree structure with the received N-tuples to find a minimum Euclidian distance solution.

8. A system according to claim 6, wherein the signal processing means: further includes:

(g) means for processing the N-tuples in accordance with said minimum distance algorithm to estimate a Q-factor (a quality-of-fit metric analogous to a signal-to-noise ratio estimate) correlated to the directions of arrival estimated by the (e) means.

9. A system according to claim 6, wherein the signal processing means: further includes:

(g) means for processing the estimated directions of arrival, the correlated Q-factors and the estimated magnitudes of the signals received at said different frequencies at said estimated directions of arrival by different sets of less than all of the plurality of arrayed antennas to determine the directions of arrival of signals received by the different sets of antennas at individual frequencies of said different frequencies.

10. A system according to claim 6, wherein the signal processing means: further includes:

(g) means for processing the estimated directions of arrival, the correlated Q-factors and the estimated magnitudes of the signals received at said different frequencies at said estimated directions of arrival by different sets of less than all of the plurality of arrayed antennas to select the different sets of antennas from which the signals are derived.

11. A system according to claim 6 in combination with:

means for processing the estimated directions of arrival, the correlated Q-factors and the estimated magnitudes of the signals received at said different frequencies by different sets of less than all of the plurality of arrayed antennas to track wideband signals, such as frequency hopped signals.

12. A system according to claim 6 in combination with:

means for processing the estimated directions of arrival, the correlated Q-factors and the estimated magnitudes of the signals received at said different frequencies by different sets of less than all of the plurality of arrayed antennas to declutter complicated signal environments across a wideband spectrum.

13. A direction finding system for determining the direction of arrival at a particular location of signals received by a plurality of antennas that are arrayed in a known pattern in relation to the particular location, the system comprising:

signal processing means for determining said direction of arrival by processing a plurality of signals derived from signals provided by different sets of less than all of the plurality of arrayed antennas in response to receipt of the signals within a predetermined band of frequencies, wherein the signal processing means includes:

(a) means for processing the derived signals individually to estimate the directions of arrival of signals within said predetermined band of frequencies received by the respective antennas of each set:

(b) means for processing derived signals for which a direction of arrival is estimated by the (a) means to estimate the magnitudes of the signals received by each of the different sets of antennas at different frequencies within the predetermined band of frequencies; and (c) means for processing the estimated directions of arrival and the estimated magnitudes of the signals received by the different sets of antennas to determine the directions of arrival of signals received by the antennas at said different frequencies:

in combination with:

means for processing the estimated magnitudes of the signals received at said different frequencies by different sets of less than all of the plurality of arrayed antennas to determine whether a said received signal is of a sufficient magnitude to be of interest; and means for demodulating said received signal that is determined to be of interest.

14. A direction finding method for determining the direction of arrival at a particular location of signals received by a plurality of antennas that are arrayed in a known pattern in relation to the particular location, the system comprising the steps of:

(a) coding signals provided by at least some of the plurality of arrayed antennas in response to receipt of the signals within a predetermined band of frequencies;

(b) combining coded signals from different sets of less than all of the plurality of arrayed antennas to provide an analog combined signal;

(c) down-converting the frequency band of the analog combined signal;

(d) converting the down-converted analog combined signal to a digital signal representative of the combined coded signals;

(e) processing the digital signal to derive signals from the plurality of signals respectively provided by the different sets of less than all of the plurality of arrayed antennas;

(f) processing the derived signals to determine the directions of arrival of the signals that are received by each set of antennas; and (g) selecting the different sets of antennas from which the received signals are provided for said coding and combination;

wherein step (a) includes the steps of:

(h) processing the derived signals individually to estimate the directions of arrival of signals within said predetermined band of frequencies received by the respective antennas of each set;

(g) processing derived signals for which a direction of arrival is estimated pursuant to step (b) to estimate the magnitudes of the signals received by each of the different sets of antennas at different frequencies within the predetermined band of frequencies; and (h) processing the estimated directions of arrival and the estimated magnitudes of the signals received by the different sets of antennas to determine the directions of arrival of signals received by the antennas at said different frequencies.

15. A direction finding method for determining the direction of arrival at a particular location of signals received by a plurality of antennas that are arrayed in a known pattern in relation to the particular location, the system comprising the steps of:

(a) determining said direction of arrival by processing a plurality of signals derived from signals provided by different sets of less than all of the plurality of arrayed antennas in response to receipt of the signals within a predetermined band of frequencies:

(b) processing the derived signals individually to estimate the directions of arrival of signals within said predetermined band of frequencies received by the respective antennas of each set;

(c) processing derived signals for which a direction of arrival is estimated pursuant to step (b) to estimate the magnitudes of the signals received by each of the different sets of antennas at different frequencies within the predetermined band of frequencies; and (d) processing the estimated directions of arrival and the estimated magnitudes of the signals received by the different sets of antennas to determine the directions of arrival of signals received by the antennas at said different frequencies;

wherein step (a) includes the steps of:

(e) processing the derived signals individually to provide amplitude and phase estimates for signals within said predetermined band of frequencies received by the respective antennas of each set; and (f) forming received N-tuples containing the amplitude and phase estimates for the respective received signals within said predetermined band of frequencies; and (g) processing the received N-tuples in accordance with a minimum distance algorithm in relation to a database of N-tuples corresponding to different directions of arrival at different frequencies to estimate the directions of arrival of the signals within the predetermined band of frequencies that are received by each antenna of each set of antennas at each of said different frequencies.

16. A computer readable medium for use with one or more computers in a direction finding system for determining the direction of arrival at a particular location of signals received by a plurality of antennas that are arrayed in a known pattern in relation to the particular location, the system comprising: signal processing means embodied in said one or more computers for determining said direction of arrival by processing a plurality of signals derived from signals provided by different sets of less than all of the plurality of arrayed antennas in response to receipt of the signals within a predetermined band of frequencies, wherein the computer readable medium contains program instructions for causing the signal processing means to perform the steps of:

(a) processing the derived signals to estimate the directions of arrival of the signals that are received by each set of antennas;

(b) processing the estimated directions of arrival to select the different sets of antennas from which the received signals are provided; and (c) processing the signals derived in accordance with said selection to determine said directions of arrival;

wherein step (a) includes the steps of:

(d) processing the derived signals individually to estimate the directions of arrival of signals within said predetermined band of frequencies received by the respective antennas of each set;

(e) processing derived signals for which a direction of arrival is estimated pursuant to step (b) to estimate the magnitudes of the signals received by each of the different sets of antennas at different frequencies within the predetermined band of frequencies; and (f) processing the estimated directions of arrival and the estimated magnitudes of the signals received by the different sets of antennas to determine the directions of arrival of signals received by the antennas at said different frequencies.

17. A computer readable medium for use with one or more computers in a direction finding system for determining the direction of arrival at a particular location of signals received by a plurality of antennas that are arrayed in a known pattern in relation to the particular location, the system comprising: signal processing means embodied in said one or more computers for determining said direction of arrival by processing a plurality of signals derived from signals provided by different sets of less than all of the plurality of arrayed antennas in response to receipt of the signals within a predetermined band of frequencies, wherein the computer readable medium contains program instructions for causing the signal processing means to perform the steps of:

(a) processing the derived signals individually to estimate the directions of arrival of signals within said predetermined band of frequencies received by the respective antennas of each set;

(b) processing derived signals for which a direction of arrival is estimated pursuant to step (a) to estimate the magnitudes of the signals received by each of the different sets of antennas at different frequencies within the predetermined band of frequencies; and (c) processing the estimated directions of arrival and the estimated magnitudes of the signals received by the different sets of antennas to determine the directions of arrival of signals received by the antennas at said different frequencies;

wherein step (b) includes the steps of:

(d) processing the derived signals individually to provide amplitude and phase estimates for signals within said predetermined band of frequencies received by the respective antennas of each set;

(e) applying complex weighting factors to the amplitude and phase estimates of the derived signals for which a direction of arrival is estimated pursuant to step (a) to compensate for phase differences in the signals derived from different antennas of a said set of antennas and summing the weighted amplitude and phase estimates to provide a directional-beam-pattern for the combination of signals received by the set of antennas; and (f) processing the directional beam pattern to estimate the magnitude of the signal being received by the set of antennas.

18. A computer readable medium for use with one or more computers in a direction finding system for determining the direction of arrival at a particular location of signals received by a plurality of antennas that are arrayed in a known pattern in relation to the particular location, the system comprising: signal processing means embodied in said one or more computers for determining said direction of arrival by processing a plurality of signals derived from signals provided by different sets of less than all of the plurality of arrayed antennas in response to receipt of the signals within a predetermined band of frequencies, wherein the computer readable medium contains program instructions for causing the signal processing means to perform the steps of:

(a) processing the derived signals individually to estimate the directions of arrival of signals within said predetermined band of frequencies received by the respective antennas of each set;

(b) processing derived signals for which a direction of arrival is estimated pursuant to step (a) to estimate the magnitudes of the signals received by each of the different sets of antennas at different frequencies within the predetermined band of frequencies; and (c) processing the estimated directions of arrival and the estimated magnitudes of the signals received by the different sets of antennas to determine the directions of arrival of signals received by the antennas at said different frequencies;

wherein step (b) includes the steps of:

(d) processing the derived signals individually to provide amplitude and phase estimates for signals within said predetermined band of frequencies received by the respective antennas of each set; and (e) forming received N-tuples containing the amplitude and phase estimates for the respective received signals within said predetermined band of frequencies; and (f) processing the received N-tuples in accordance with a minimum distance algorithm in relation to a database of N-tuples corresponding to different directions of arrival at different frequencies to estimate the directions of arrival of the signals within the predetermined band of frequencies that are received by each antenna of each set of antennas at each of said different frequencies.

19. A computer readable medium according to claim 18, wherein the minimum distance algorithm includes the steps of:

(g) utilizing a tree structured vector quantization (TSVQ) technique to organize the calibrated N-tuple database into a logical tree structure based on Euclidian distance considerations; and (h) traversing the logical tree structure with the received N-tuples to find a minimum Euclidian distance solution.

* * * * *

UNITED STATES PATENT AND TRADEMARK OFFICE
CERTIFICATE OF CORRECTION

PATENT NO. : 7,477,192 B1
APPLICATION NO. : 11/709405
DATED : January 13, 2009
INVENTOR(S) : Andrew Haff et al.

It is certified that error appears in the above-identified patent and that said Letters Patent is hereby corrected as shown below:

Column 6, line 3, in Equation 2, "Ci" (2nd and 4th occurrences) should be --C1--
Column 8, line 5, after "372,", insert --...,--
Column 8, line 14, "DM" should be --Dm--
Column 9, line 5, after "D2,", insert --...,--
Column 10, line 3, after "5,396,625", insert a period
Column 10, line 26, "I" should be --1--
Column 10, line 40, after "52", insert a period
Column 11, line 19, "w2" should be --wm--
Column 11, line 64, "estimates" should be omitted
Column 11, line 65, "of" (first occurrence) should be omitted
Column 15, line 25, claim 3 "the" should be omitted
Column 16, line 47, claim 6 "the steps of" should be omitted
Column 17, line 8, claim 8 ":" should be omitted after "means"
Column 17, line 15, claim 9 ":" should be omitted after "means"
Column 17, line 25, claim 10 ":" should be omitted after "means"
Column 18, line 5, claim 13 ":" should be --;--

Signed and Sealed this

Fourteenth Day of April, 2009

JOHN DOLL
*Acting Director of the United States Patent and Trademark Office*